United States Patent
Béliveau et al.

(10) Patent No.: US 12,017,932 B2
(45) Date of Patent: *Jun. 25, 2024

(54) VORTEX GRIT REMOVAL APPARATUS WITH EDDY GENERATOR

(71) Applicant: VEOLIA WATER SOLUTIONS & TECHNOLOGIES SUPPORT, Saint Maurice (FR)

(72) Inventors: Marc Béliveau, Montréal (CA); Martin Caspar, Montréal (CA); Philippe Lefrançois, Montréal (CA); Adrien Moreau, Newton, MA (US); Aurélien Pauléat, Montréal (CA); Simon Vincent, Kirkland (CA)

(73) Assignee: VEOLIA WATER SOLUTIONS & TECHNOLOGIES SUPPORT, Saint Maurice (FR)

( * ) Notice: Subject to any disclaimer, the term of this patent is extended or adjusted under 35 U.S.C. 154(b) by 103 days.

This patent is subject to a terminal disclaimer.

(21) Appl. No.: 17/256,840

(22) PCT Filed: May 8, 2019

(86) PCT No.: PCT/CA2019/050609
§ 371 (c)(1),
(2) Date: Dec. 29, 2020

(87) PCT Pub. No.: WO2020/019057
PCT Pub. Date: Jan. 30, 2020

(65) Prior Publication Data
US 2021/0284552 A1    Sep. 16, 2021

Related U.S. Application Data

(60) Provisional application No. 62/701,976, filed on Jul. 23, 2018.

(51) Int. Cl.
*C02F 1/38* (2023.01)

(52) U.S. Cl.
CPC .......... *C02F 1/38* (2013.01); *C02F 2201/002* (2013.01); *C02F 2301/024* (2013.01); *C02F 2301/026* (2013.01)

(58) Field of Classification Search
CPC .... C02F 1/38; C02F 1/385; C02F 1/00; C02F 1/34; C02F 2201/002; C02F 2301/024;
(Continued)

(56) References Cited

U.S. PATENT DOCUMENTS 2,700,468 A    1/1955   Fontein
3,965,013 A    6/1976   Jackson
(Continued)

FOREIGN PATENT DOCUMENTS

CA    2053819 C    4/1996
CA    2432826 C    9/2011
(Continued)

OTHER PUBLICATIONS

Eddy (Fluid Dynamics), Wikipedia; https://en.wikipedia.org/wiki/Eddy_(fluid_dynamics) dated Jun. 14, 2018.
(Continued)

*Primary Examiner* — Akash K Varma
(74) *Attorney, Agent, or Firm* — Jacob M. Ward; Ward Law Office LLC

(57) ABSTRACT

Apparatus for separating grit from a grit-loaded liquid matrix while retaining organic solids in suspension, including an inlet for admitting liquid matrix into the apparatus, an outlet for removing grit-lite liquid matrix from the apparatus main chamber, and a vortex system for removing separated liquid matrix grit from the apparatus. The grit settling main chamber defines upper and lower subchambers communicating with each other through a central aperture. A fluid
(Continued)

flow speed gradient is established between the apparatus fluid inlet and outlet. An Eddy type fluid dynamic component is added, providing combined enhanced coarse grit and fine organics discrimination and separation. The Eddy fluid dynamic component may consist of a trio of stationary fresh water supply force fed eductors. Each eductor produces a fresh water fluid flow interacting with the liquid matrix fluid flow inside the upper subchamber, whereby Eddy-type turbulences are generating promoting fine, liquid matrix grit particle separation from the liquid matrix.

20 Claims, 21 Drawing Sheets

(58) Field of Classification Search
CPC .......... C02F 2301/026; B01D 21/0036; B01D 21/0087; B01D 21/2411; B01D 21/2427; B01D 21/26; B01D 21/265; B01D 21/00; B01D 21/24; B04C 2009/008; B04C 5/04; B04C 5/08; B04C 5/103; B04C 11/00
USPC ...................................................... 210/512.1
See application file for complete search history.

(56) References Cited

U.S. PATENT DOCUMENTS

| | | |
|---|---|---|
| 4,576,720 A | 3/1986 | Mandt |
| 7,001,525 B2 | 2/2006 | Binot et al. |
| 7,244,362 B2 | 7/2007 | Binot |
| 7,699,984 B2 | 4/2010 | Andoh et al. |
| 8,715,511 B2 | 5/2014 | Beliveau et al. |
| 9,932,731 B2 | 4/2018 | Noonan et al. |

| | | | |
|---|---|---|---|
| 2005/0173354 A1* | 8/2005 | Binot | B01D 21/267 210/85 |
| 2007/0108122 A1* | 5/2007 | Andoh | B01D 21/2444 210/512.1 |
| 2010/0237008 A1* | 9/2010 | Goninan | B04C 5/103 210/512.1 |
| 2011/0240568 A1* | 10/2011 | Beliveau | B01D 21/2405 210/787 |
| 2016/0038952 A1* | 2/2016 | Noonan | B01D 21/2444 210/512.1 |

FOREIGN PATENT DOCUMENTS

| | | | |
|---|---|---|---|
| EP | 1360148 B1 | 9/2006 | |
| FR | 2820733 A1 | 8/2002 | |
| GB | 191314428 * | 6/1914 | |
| GB | 191314428 A | 6/1914 | |
| GB | 2128905 A * | 5/1984 | ............... B03B 5/34 |
| WO | 2005000444 A1 | 1/2005 | |

OTHER PUBLICATIONS

Hydro International UK Ltd., HeadCell; https://hydro-int.com/en/products/headcell; in the name of Hydro international head cell, Jun. 14, 2018.
Hydro International UK Ltd., Grit King; https://hydro-int.com/en/products/headcell; in the name of Hydro international grit king, Jun. 14, 2018.
Water Online—"Grit Particle Settling: Refining The Approach"; By Herrick, Neumayer, and Osei; https://www.wateronline.com/doc/grit-particle-settling-refining-the-approach-000; Mar. 25, 2015.
WaterWorld—"Advanced Grit Management: A Rigorous Philosophy for Grit Removal"; By Marcia Sherony; https://www.waterworld.com/international/wastewater/article/16192859/advanced-grit-management-a-rigorous-philosophy-for-grit-removal; Jun. 2, 2014.
Supplementary European Search Report dated Mar. 21, 2022.

* cited by examiner

Mectan V
Operating conditions
Flow speed: 10.00 United States Million Gallons per day
Downstream water level: 23.22"

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 39 | 353 | 9.9 | 5.24E-13 | 1.39E-09 | 5.41E-08 | 5.44E-07 | 1.65E-05 | 2.21E-05 | 75% |
| 150 | 122 | 270 | 31.1 | 1.77E-12 | 4.68E-09 | 5.71E-07 | 1.84E-06 | | | |
| 210 | 273 | 119 | 69.6 | 4.85E-12 | 1.28E-08 | 3.51E-06 | 5.04E-06 | | | |
| 300 | 331 | 61 | 84.4 | 1.41E-11 | 3.75E-08 | 1.24E-05 | 1.47E-05 | | | |
| 400 | 355 | 37 | 90.6 | | | | | | | |

Fig. 14

Flow speed: 3.57 United States Million Gallons per day
Downstream water level: 11.34"

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 215 | 177 | 54.8 | 5.24E-13 | 1.39E-09 | 2.98E-07 | 5.44E-07 | 2.10E-05 | 2.21E-05 | 95% |
| 150 | 319 | 73 | 81.4 | 1.77E-12 | 4.68E-09 | 1.49E-06 | 1.84E-06 | | | |
| 210 | 361 | 31 | 92.1 | 4.85E-12 | 1.28E-08 | 4.64E-06 | 5.04E-06 | | | |
| 300 | 389 | 3 | 99.2 | 1.41E-11 | 3.75E-08 | 1.46E-05 | 1.47E-05 | | | |
| 400 | 392 | 0 | 100.0 | | | | | | | |

Operating conditions

| | |
|---|---|
| Flow speed | 10.00 United States Million Gallons per day |
| Downstream water level | 23.22" |

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 5 | 387 | 1.3 | 5.24E-13 | 1.39E-09 | 6.94E-09 | 5.44E-07 | 1.66E-05 | 2.21E-05 | 75% |
| 150 | 20 | 372 | 5.1 | 1.77E-12 | 4.68E-09 | 9.37E-08 | 1.84E-06 | | | |
| 210 | 289 | 103 | 73.7 | 4.85E-12 | 1.28E-08 | 3.71E-06 | 5.04E-06 | | | |
| 300 | 341 | 51 | 87.0 | 1.41E-11 | 3.75E-08 | 1.28E-05 | 1.47E-05 | | | |
| 400 | 366 | 26 | 93.4 | | | | | | | |

Fig. 17

Operating conditions

| | |
|---|---|
| Flow speed | 3.57 United States Million Gallons per day |
| Downstream water level | 11.34" |

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 90 | 302 | 23.0 | 5.24E-13 | 1.39E-09 | 1.25E-07 | 5.44E-07 | 2.15E-05 | 2.21E-05 | 97% |
| 150 | 362 | 30 | 92.3 | 1.77E-12 | 4.68E-09 | 1.70E-06 | 1.84E-06 | | | |
| 210 | 389 | 3 | 99.2 | 4.85E-12 | 1.28E-08 | 5.00E-06 | 5.04E-06 | | | |
| 300 | 392 | 0 | 100.0 | 1.41E-11 | 3.75E-08 | 1.47E-05 | 1.47E-05 | | | |
| 400 | 392 | 0 | 100.0 | | | | | | | |

Eductor reverse flow on Mectan V

Operating conditions

| Flow speed | 10.00 | United States Million Gallons per day |
| Downstream water level | 23.22" | |

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 3 | 389 | 0.8 | 5.24E-13 | 1.39E-09 | 4.16E-09 | 5.44E-07 | 1.68E-05 | 2.21E-05 | 76% |
| 150 | 47 | 345 | 12.0 | 1.77E-12 | 4.68E-09 | 2.20E-08 | 1.84E-06 | | | |
| 210 | 284 | 108 | 72.4 | 4.85E-12 | 1.28E-08 | 3.65E-06 | 5.04E-06 | | | |
| 300 | 344 | 48 | 87.8 | 1.41E-11 | 3.75E-08 | 1.90E-05 | 1.47E-05 | | | |
| 400 | 366 | 26 | 93.4 | | | | | | | |

Fig. 18

| Flow speed | 3.57 | United States Million Gallons per day |
| Downstream water level | 11.34" | |

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 202 | 190 | 51.5 | 5.24E-13 | 1.39E-09 | 2.80E-07 | 5.44E-07 | 2.15E-05 | 2.21E-05 | 97% |
| 150 | 366 | 26 | 93.4 | 1.77E-12 | 4.68E-09 | 1.71E-06 | 1.84E-06 | | | |
| 210 | 387 | 5 | 98.7 | 4.85E-12 | 1.28E-08 | 4.97E-06 | 5.04E-06 | | | |
| 300 | 389 | 3 | 99.2 | 1.41E-11 | 3.75E-08 | 1.46E-05 | 1.47E-05 | | | |
| 400 | 392 | 0 | 100.0 | | | | | | | |

Fig. 19

Eductor reverse flow (double flow)

Operating conditions

Flow speed 10.00 United States Million Gallons per day
Downstream water level 23.22"

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 7 | 385 | 1.8 | 5.24E-13 | 1.39E-09 | 9.71E-09 | 5.44E-07 | 1.66E-05 | 2.21E-05 | 75% |
| 150 | 88 | 304 | 22.4 | 1.77E-12 | 4.68E-09 | 4.12E-07 | 1.84E-06 | | | |
| 210 | 276 | 116 | 70.4 | 4.85E-12 | 1.28E-08 | 3.55E-06 | 5.04E-06 | | | |
| 300 | 338 | 54 | 86.2 | 1.41E-11 | 3.75E-08 | 1.27E-05 | 1.47E-05 | | | |
| 400 | 364 | 28 | 92.9 | | | | | | | |

Fig. 20

BIOMECTAN without eductor

Operating conditions

| | |
|---|---|
| Flow speed | 10.47 |
| Downstream water level | ** |

United States Million Gallons per day

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 440 | 678 | 39.4 | 5.24E-13 | 1.39E-09 | 6.11E-07 | 1.55E-06 | 5.47E-05 | 6.30E-05 | 87% |
| 150 | 719 | 399 | 64.3 | 1.77E-12 | 4.68E-09 | 3.37E-06 | 5.24E-06 | | | |
| 210 | 912 | 206 | 81.6 | 4.85E-12 | 1.28E-08 | 1.17E-05 | 1.44E-05 | | | |
| 300 | 1042 | 76 | 93.2 | 1.41E-11 | 3.75E-08 | 3.90E-05 | 4.19E-05 | | | |
| 400 | 1118 | 0 | 100.0 | | | | | | | |

Fig. 21

| | |
|---|---|
| Flow speed | 3.00 |
| Downstream water level | ** |

United States Million Gallons per day

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 624 | 494 | 55.8 | 5.24E-13 | 1.39E-09 | 8.66E-07 | 1.55E-06 | 6.19E-05 | 6.30E-05 | 98% |
| 150 | 1021 | 97 | 91.3 | 1.77E-12 | 4.68E-09 | 4.78E-06 | 5.24E-06 | | | |
| 210 | 1117 | 1 | 99.9 | 4.85E-12 | 1.28E-08 | 1.44E-05 | 1.44E-05 | | | |
| 300 | 1118 | 0 | 100.0 | 1.41E-11 | 3.75E-08 | 4.19E-05 | 4.19E-05 | | | |
| 400 | 1118 | 0 | 100.0 | | | | | | | |

Fig. 22

BIOMECTAN with eductor (foward)

Operating conditions
Flow speed: 3.00     United States Million Gallons per day
Downstream water level: **

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 708 | 410 | 63.3 | 5.24E-13 | 1.39E-09 | 9.82E-07 | 1.55E-06 | 6.19E-05 | 6.30E-05 | 98% |
| 150 | 1007 | 111 | 90.1 | 1.77E-12 | 4.68E-09 | 4.72E-06 | 5.24E-06 | | | |
| 210 | 1118 | 0 | 100.0 | 4.85E-12 | 1.28E-08 | 1.44E-05 | 1.44E-05 | | | |
| 300 | 1118 | 0 | 100.0 | 1.41E-11 | 3.75E-08 | 4.19E-05 | 4.19E-05 | | | |
| 400 | 1118 | 0 | 100.0 | | | | | | | |

Fig. 23

BIOMECTAN with eductor (reverse)

Operating conditions
Flow speed: 10.00     United States Million Gallons per day
Downstream water level: **

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 403 | 715 | 36.0 | 5.24E-13 | 1.39E-09 | 5.59E-07 | 1.55E-06 | 5.45E-05 | 6.30E-05 | 87% |
| 150 | 676 | 442 | 60.5 | 1.77E-12 | 4.68E-09 | 3.17E-06 | 5.24E-06 | | | |
| 210 | 820 | 298 | 73.3 | 4.85E-12 | 1.28E-08 | 1.11E-05 | 1.44E-05 | | | |
| 300 | 1075 | 43 | 96.2 | 1.41E-11 | 3.75E-08 | 4.03E-05 | 4.19E-05 | | | |
| 400 | 1118 | 0 | 100.0 | | | | | | | |

Fig. 24

Flow speed 3.00 United States Million Gallons per day
Downstream water level **

Particle tracking

| Ø (microns) | Flooring of tank | Downstream flow | Screening % relative to granulometry | Granular particle size | Granular particle weight | Total mass removed | Total mass injected | Total mass removed | Total mass injected | Performance |
|---|---|---|---|---|---|---|---|---|---|---|
| 100 | 575 | 543 | 51.4 | 5.24E-13 | 1.39E-09 | 7.98E-07 | 1.55E-06 | 6.19E-05 | 6.30E-05 | 98% |
| 150 | 1047 | 71 | 93.6 | 1.77E-12 | 4.68E-09 | 4.90E-06 | 5.24E-06 | | | |
| 210 | 1112 | 6 | 99.5 | 4.85E-12 | 1.28E-08 | 1.43E-05 | 1.44E-05 | | | |
| 300 | 1118 | 0 | 100.0 | 1.41E-11 | 3.75E-08 | 4.19E-05 | 4.19E-05 | | | |
| 400 | 1118 | 0 | 100.0 | | | | | | | |

Fig. 25

VORTEX GRIT REMOVAL APPARATUS WITH EDDY GENERATOR

CROSS-REFERENCE TO RELATED APPLICATIONS

This patent application is a United States National Stage of International Patent Application No. PCT/CA2019/050509, filed 8 May 2019, which in turn claims Convention priority based upon U.S. provisional patent application No. 62/701,976, filed 23 Jul. 2018. The entire disclosures of the above patent applications are incorporated herein by reference.

FIELD OF THE INVENTION

The present invention relates to a grit removal apparatus for municipal and industrial waste water management as well as for drinking water applications, addressing grit capture and removal concurrently with organic material regulation.

A general object of the present invention is to improve upon U.S. Pat. No. 8,715,511 issued May 6, 2014 to the present applicant.

An object of the invention is to improve upon fine particle size grit removal in wastewater treatment facilities, while concurrently regulating organic materials in suspension.

BACKGROUND OF THE INVENTION

Grit is a source of problems in wastewater treatment facilities, which causes wear and tear on mechanical equipment, decreases the effective treatment volume in basins, causes pipe blockages and generally increases operating costs.

Known vortex type grit removal apparatuses are based on hydraulic profiles to separate coarse particles (sand) from diametrally smaller fine particles (organics). A mechanical (e.g. paddle) mixer in such grit removal apparatuses assists in keeping part of the organics in suspended state and in dynamically forwarding same by increased vortex speed generated hydraulically.

In the present applicant's said U.S. Pat. No. 8,715,511, there is disclosed an induced vortex grit removal system including a grit unit circular chamber that takes advantage of the tangential inflow velocity along the peripheral wall of the chamber to assist in the grit removal process. The general principle of operation thereof can be summarized as follows:
a. Influent is fed tangentially into the grit chamber;
b. Mechanical mixer paddles maintain fluid rotation velocity inside the grit chamber, allowing grit to settle while holding organics in suspension;
c. Circular and conical shapes of structural components combined with natural vortex and gravity forces reduce turbulence, thus maximizing grit settling;
d. Sloped transition between upper chamber section and grit well promotes grit settling to the bottom grit well; and
e. Grit is transferred from grit well to a clarifier via a pump.

In an alternate prior art grit removal system, the inlet port is positioned in the lower portion of the separation tank section, the inlet flow path is isolated from the outlet flow path by means of a separator disc set inside the tank, the grit chamber outlet channel is set in-line with the inlet channel direction, and the separator disc provides the possibility to position the outlet channel in any desired direction relative to the inlet channel. What is obtained is constant velocity, low head loss, retrofittable into existing waste management plants, moving parts subjected to wear being located underwater, low maintenance cost, and sloped transition and rotating fluid motion eliminates accumulation of grit in the separation chamber and accessibility to grit collecting well. In addition, the separation disc increases grit removal process stability and reliability, together with providing control over grit removal process independent of flow rate and improved circular flow path to prevent short-circuiting. Hydraulically safe tank design maintains grit removal performance even during power failure.

A grit removal wastewater treatment system may include an annular vertical wall, and a horizontal annular ring located above the grit removal chamber and extending radially outwardly from the annular vertical wall, so that waste water ("liquid matrix") fluid overflows radially outwardly over this vertical wall. An influent channel extends into the grit removal chamber beneath the horizontal ring and an effluent channel extends above the horizontal ring and extends out of the chamber.

Under principles of general fluid dynamics, by adjusting the velocities of fluids, a transition is observed from laminar to turbulent flow, characterized by the formation of eddies and vortices. The so-called Reynolds number, used to determine when turbulent flow will occur, is the ratio between inertial forces and viscous forces. An Eddy is the swirling of a fluid generated by an obstacle within the liquid stream when the fluid is in a turbulent flow regime. The moving fluid creates a space devoid of downstream-flowing fluid on the downstream side of the obstacle. Fluid behind the obstacle flows into the void creating a swirl of fluid on each edge of the obstacle, followed by a short reverse flow of fluid behind the obstacle flowing upstream, toward the back of the obstacle. An Eddy is not a property of the fluid, but a swirling motion caused by the position and direction of turbulent fluid flows.

In a fluid flow, streamlines are generated forming field lines. Considering a velocity vector field in three dimensional space in the framework of continuous mechanics, streamlines are a family of curves that are instantaneously tangent to the velocity vector of the flow. These show the direction in which a fluid element will travel at any point in time. By definition, different streamlines at the same instant in a flow do not intersect, because a fluid particle cannot have two different velocities at the same point. Streamlines provide a snapshot of some flow-field characteristics.

SUMMARY OF THE INVENTION

The present invention of combined grit and organics removal introduces fluid dynamic generators of the Eddy type, located inside the grit chamber and generating forward or reverse fluid flows from hydraulic or pneumatic fluid ejecting apparatus or "eductors". These eductors generate fluid flows providing unexpectedly improved performance in grit removal capabilities of fine sized particles (e.g. in the range of 100 to 150 micrometers in diameter).

In the present invention, the waste water management grit removal apparatus incorporates an Eddy generator, located intermediately centrally inside the main chamber and consisting of at least one forward or reverse fluid flow eductor fed by either an external source of fresh water or air. In one embodiment, there is provided an array of three radially equidistant spaced flow eductors forming the Eddy generator section of the grit removal apparatus. Each eductor is a stationary component inside the grit chamber and includes an intake port through which fresh water is injected, and an outlet nozzle directed coaxially (either toward or away from) the incoming wastewater flow. This injected fluid is fed by a motorized water pump, wherein a single pump is used for all (e.g. three) eductors. Each eductor releases water or air flows in an axial direction identical ("forward flow") or opposite to ("reverse flow") the main vortex fluid flow. The pumping fluid flow rate is calculated in such a way as to generate a wave front of sufficient but not excessive value, in order to partly deflect the main vortex fluid flow (e.g. having a speed greater than one meter per second), which thus creates an Eddy (or turbulent flow) downstream of the eductor, therefore creating localized high speed fluid shear zones to help separate/wash the grit particles. This turbulent flow area enables creation of an intense fluid contacting area where the grit and non-vortex separated organic particles (not typically separated because they are attached to heavier inorganic particles) become "broken down" and are then able to separate the organic part from the grit. The separated fine grit particles are captured by the central area of the grit removal apparatus into a low turbulence area.

Accordingly, the invention relates to an apparatus for separating grit from a grit loaded liquid matrix while retaining organic solids in suspension including an inlet for admitting liquid matrix into the apparatus, an outlet for removing purified water from which liquid matrix has been separated inside the apparatus main chamber, and a vortex system for removing separated liquid matrix grit from the apparatus. The grit settling main chamber defines upper and lower subchambers communicating with each other through a central aperture. A fluid flow speed gradient is established between the apparatus fluid inlet and outlet. An Eddy type fluid dynamic component is added, providing combined enhanced coarse grit and fine organics discrimination and separation. The Eddy fluid dynamic component may consist of a trio of stationary fresh water supply force fed eductors. Each eductor produces a fresh water fluid flow interacting with the liquid matrix fluid flow inside the upper subchamber whereby Eddy-type turbulences are generating promoting fine, liquid matrix grit particle separation from the liquid matrix.

More particularly, the present invention relates to an apparatus for separating grit from a grit-loaded liquid matrix while retaining liquid matrix organic solids in suspension and water, including inlet means for admitting the liquid matrix into the apparatus, outlet means for removing grit-lite liquid matrix from the apparatus, and means for removing separated grit from the apparatus, the apparatus further comprising: a cylindrical grit settling main chamber defining a bottom end portion, a top end and a peripheral wall; said means for removing separated grit from apparatus cooperating with said main chamber bottom and portion; a secondary chamber including a central grit settling access top mouth opening through said main chamber bottom end portion; a partition extending transversely through said main chamber intermediate said top end and said bottom end portion thereof spacedly therefrom wherein an upper subchamber is formed in said main chamber above said partition and a lower subchamber is formed in said main chamber below said partition, said liquid matrix inlet means in direct fluid communication with said lower subchamber, said gritlite liquid matrix outlet means in direct fluid communication with said upper subchamber, said partition having a peripheral edge, integrally mounted in substantially fluid tight fashion to said peripheral wall of said main chamber, and a central aperture; wherein a liquid matrix fluid flow speed gradient is established between said upper and lower subchambers through said partition central aperture; and further including a turbulence generating fluid dynamic component, mounted inside said upper subchamber and providing enhanced fine grit separation from said liquid matrix, said fluid dynamic component producing Eddy-type turbulences inside said upper subchamber.

In one embodiment, said turbulence generating fluid dynamic component includes at least one eductor, fixedly mounted inside said upper subchamber, and a fresh water supply means force fed to said eductor. Said at least one eductor could then generate eductor fluid flows in the same direction as—or alternately in the opposite direction to— that of the liquid matrix inside said upper subchamber.

In one embodiment, there are three stationary eductors fixedly mounted to said main chamber peripheral wall in radially equidistant fashion to one another.

In an alternate embodiment of the invention, said upper subchamber is further subdivided into a top subchamber and an intermediate subchamber, said eductors then mounted inside said intermediate subchamber, wherein an annular horizontal ring is formed between said top and intermediate subchambers and fixedly mounted tangentially to said main chamber peripheral wall and defining a central bore, and further including an annular vertical wall mounted within said ring central bore and projecting upwardly therefrom short of said main chamber top end, wherein said annular vertical wall forms a radially outward overflow surface for said grit-lite liquid matrix. Said eductors could then generate eductor fluid flows either in the same direction of flow as—or in the opposite direction of flow to—the liquid matrix inside said intermediate subchamber.

BRIEF DESCRIPTION OF THE DRAWINGS

FIGS. 14 and 15 disclose two tables showing performance parameters in rows and columns in operating conditions of a grit removal apparatus at 10 and 3 MGD flow rate, respectively, accordingly to the grit removal apparatus as shown in FIG. 1;

FIGS. 16 and 17 disclose two other tables showing performance parameters in rows and columns for particle tracking with forward flow eductors mounted to the first embodiment of FIGS. 2 and 3 of grit removal apparatus at 10 and 3.57 MGD flow rate respectively, with parameters in the tables suggesting performance improvement from addition of eductors;

FIGS. 18, 19 and 20 disclose three other tables showing performance parameters in rows and columns for particle tracking with reverse flow eductors mounted inside a grit removal apparatus at 10, 3.57 and 10 MGD flow rate respectively, according to the second embodiment of the invention illustrated in FIGS. 4 and 5, with FIG. 18 suggesting slight overall performance improvement while FIG. 19 suggesting performance improvement on small flow speeds for fine sized particles, and FIG. 20 disclosing performance parameters for particle tracking with eductors reverse flow at double flow rate mounted to a grit removal apparatus;

FIGS. 21 and 22 disclose two other tables showing performance parameters in rows and columns for particle tracking in an eductor-less grit removal apparatus at 10.47 and 3 MGD flow rates respectively, according to the embodiment of FIGS. 6-7;

FIG. 23 discloses another table showing performance parameters in rows and columns for particle tracking with forward flow rate eductors at 3 MGD in a grit removal apparatus, according to the embodiment at FIG. 8, and suggesting increased performance in fine particles; and FIGS. 24 and 25 disclose two other tables showing performance parameters in rows and columns for particle tracking with reverse flow eductors, at 10 and 3 MGD respectively, in a grit removal apparatus according to the second embodiment of the invention, as illustrated in FIG. 9, and with FIG. 24 suggesting increased performance at low fluid flow speeds with Eddy-type turbulence dissipation.

DETAILED DESCRIPTION OF THE INVENTION

Figure 1:
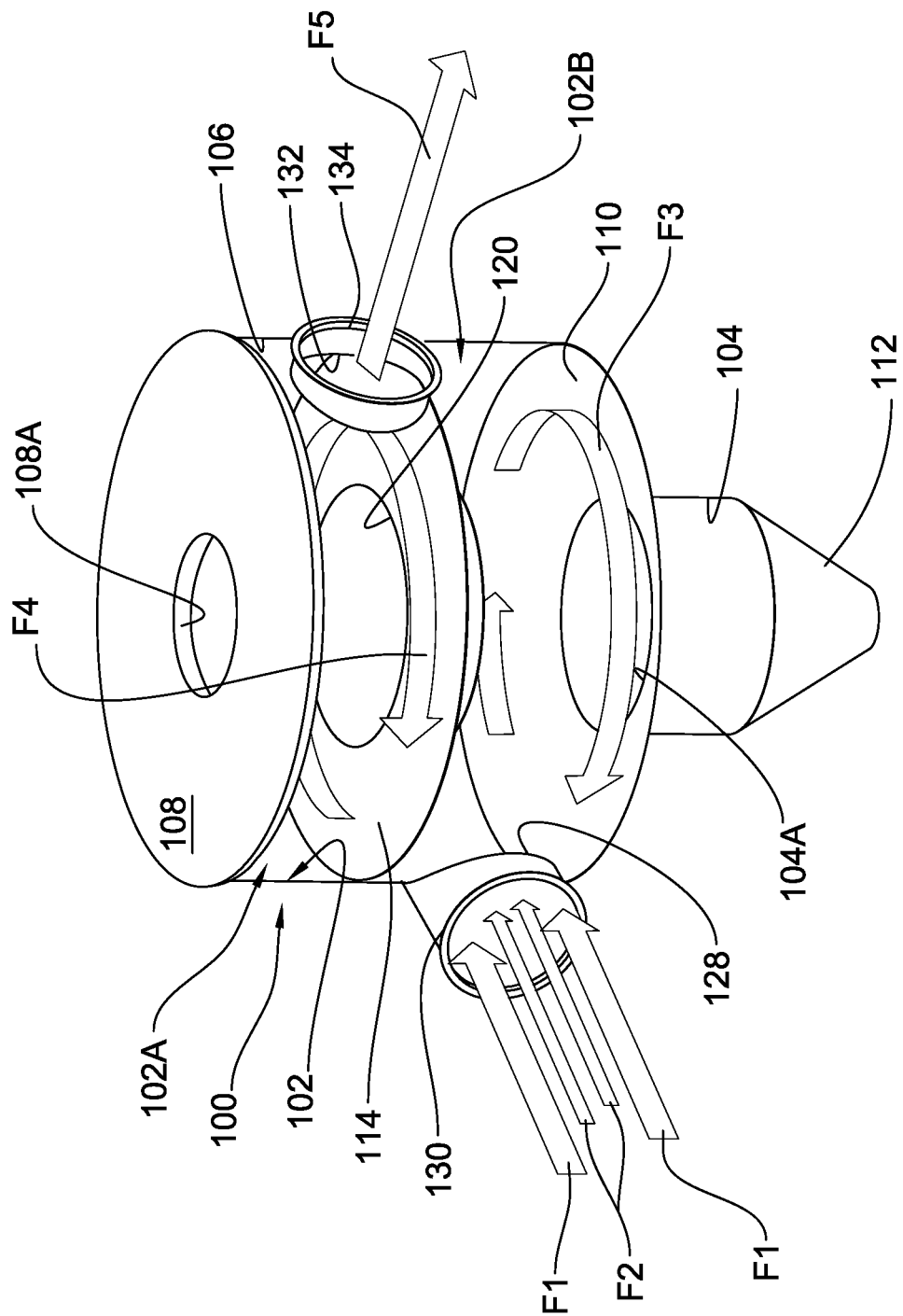
FIG. 1 is an isometric schematic view of a grit removal apparatus, suggesting fluid dynamics where relative intake and outflow fluid flow speeds are correlated with arrow bands width.

FIG. 1 schematically shows a number of major components in an apparatus for separating grit from incoming grit-loaded waste water (or "liquid matrix"), 100. Apparatus 100 includes a main cylindrical settling chamber 102, disposed immediately above and concentric to an underlying diametrally smaller secondary cylindrical grit channel 104 and downward coaxial funnel member 112.

Figure 12:
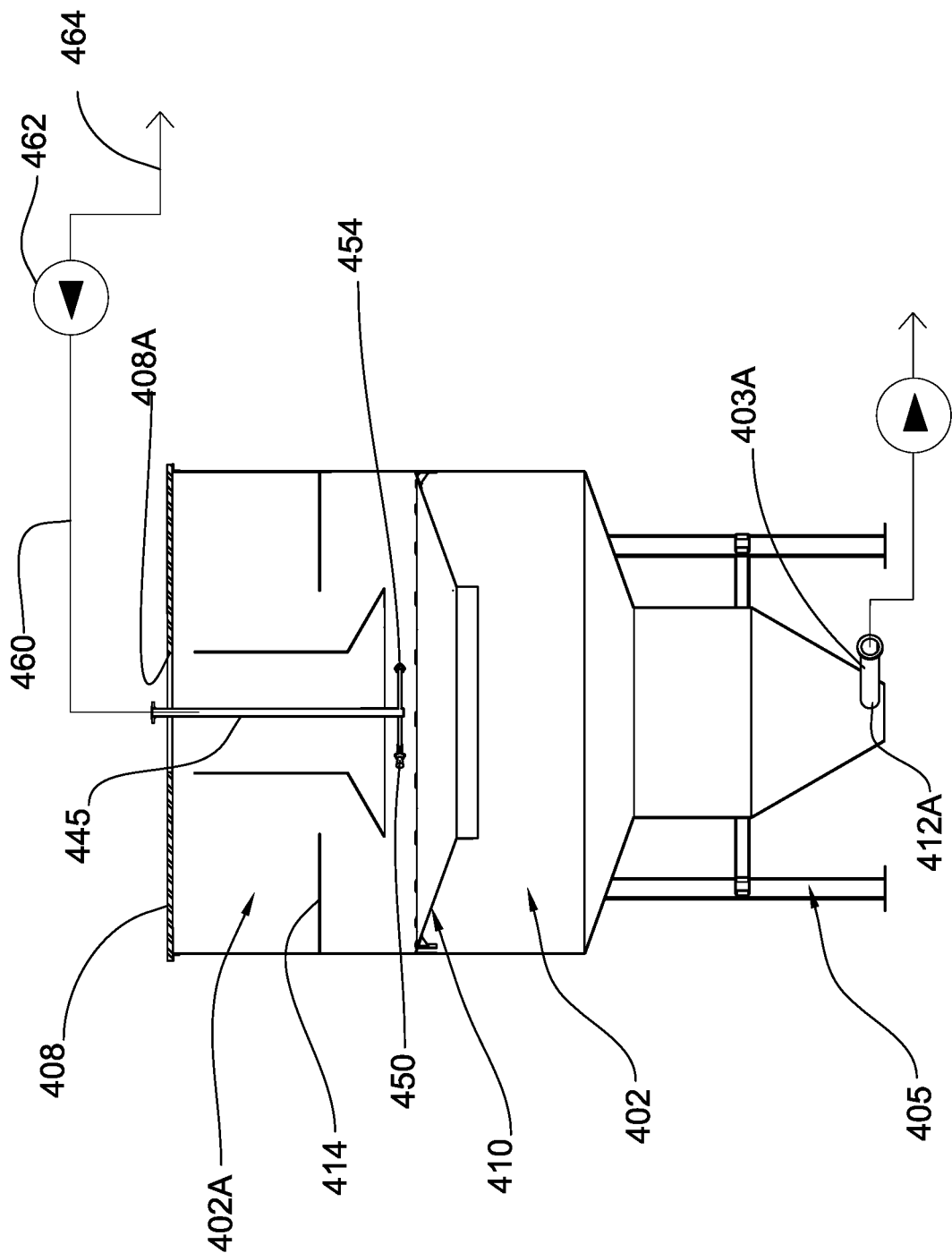
FIG. 12 is an elevational partly sectional view of the grit removal apparatus embodiment of FIGS. 6-9, with ground supporting frame and showing the central vertical shaft supporting at its bottom end two eductor-carrying radial arms and connected at its top end to a motorized water supply pump for feeding fresh water to the eductors.

As illustrated in FIG. 12, the bottom end portion of funnel member 412 (112) includes a transverse bore 412A through which escapes a tubular member 403. Tubular member 403 thus transversely projects from funnel member 112 (412) and designed to be coupled to a grit extraction pump (not shown) for forcibly removing separated grit through funnel member 412. However grit removal pump and associated funnel member 412 (112) could be replaced by any other suitable grit removal means, e.g. power operated, grit well fed under gravity borne forces, or otherwise. Chamber 102 defines an upright peripheral wall 106 and a top horizontal 108. A vertical cylindrical chute 104 opens at mouth 104A through bottom wall 110. Funnel member 112 downwardly axially depends from chute 104, for grit discharge through grit outlet tube 403A. Chamber 102 is supported in upright condition over ground by frame 405 (FIG. 12).

A planar horizontal, or horizontal conical partition 114 as shown, is mounted into main chamber 102 spacedly above flooring 110 and spacedly below main chamber top wall 108. Partition 114 defines a central mouth 120, and merges in fluid tight fashion at its radially outward edge with peripheral wall 106. Top wall 108 also includes a central aperture 108A coaxial with mouth 120.

Accordingly, an upper subchamber 102A is formed between the partition 114 and the top wall 108 of main chamber 102, and a lower subchamber 10213 is formed between the partition 114 and the flooring 110 of chamber 102, wherein subchambers 102A and 10213 come in fluid communication only through radially inward central mouth 120 of partition 114. In one embodiment, flooring 110 is downwardly conical.

Partition 114 is sized and shaped relative to grit settling chamber 102 in such a fashion as to restrict all vortex induced upward flow of liquid matrix only through partition central mouth 120. The liquid matrix partially purged from grit from the original grit loaded liquid matrix coming from incoming waste water fluid flows F1 and F2, is not allowed to flow upwardly between the sealed radially outward peripheral edge portion of partition 114 and the peripheral wall 106 of grit settling chamber 102, so that all water flow between sub-chambers 102A and 10213 occur only through central mouth 120.

A fluid intake port 128 transversely opens through upright peripheral wall 106 and into lower subchamber 10213. A grit loaded liquid matrix intake channel 130 opens at one end into intake port 128, for ingress into subchamber 10213 of liquid matrix flows F1 and F2. Channel 130 tangentially intersects the lower portion of main settling chamber wall 106 so as to cause the incoming influent liquid matrix to flow tangentially into lower subchamber 10213. A centrifugal force is generated for the liquid matrix fluid engaging inside cylindrical lower subchamber 10213, which brings about liquid matrix flow forcibly radially outwardly against the interior wall of lower subchamber 10213. Accordingly, liquid matrix flow is designed to flow coaxially through inlet port 128 and into subchamber 10213 at substantial flow speeds F1 and F2, with wider arrow bands F2 indicating higher fluid flow speed and with narrower arrow band F1 indicating smaller fluid flow speed.

A fluid outlet port 132 transversely opens through upright wall 106 and into upper subchamber 102A. Fluid channel 134 transversely opens at one end into fluid outlet port 132 along an axis offset relative to that of fluid inlet channel 130, for outflow escape of grit-lite liquid matrix (including water and organic solids in suspension and substantially decreased concentration of grit) from upper subchamber 102A and into fluid outlet channel 134. In one embodiment, grit-lite liquid matrix is a completely grit-less liquid matrix.

After liquid matrix flows F1 and F2 have engaged into lower subchamber 10213, a clockwise rotational current flow F3 is formed therein; grit-lite liquid matrix escapes upwardly through partition central mouth 120 and into upper chamber 102A, where a further clockwise rotational flow current F4 occurs, to be able thereafter to escape tangentially through channel 134 along fluid flow F5. Grit released from the grit-lite liquid matrix falls by gravity from lower subchamber 10213 through mouth 104A, into funnel body 104, 112, through escape bore 412A and beyond along tubular member 403A.

Figure 2:
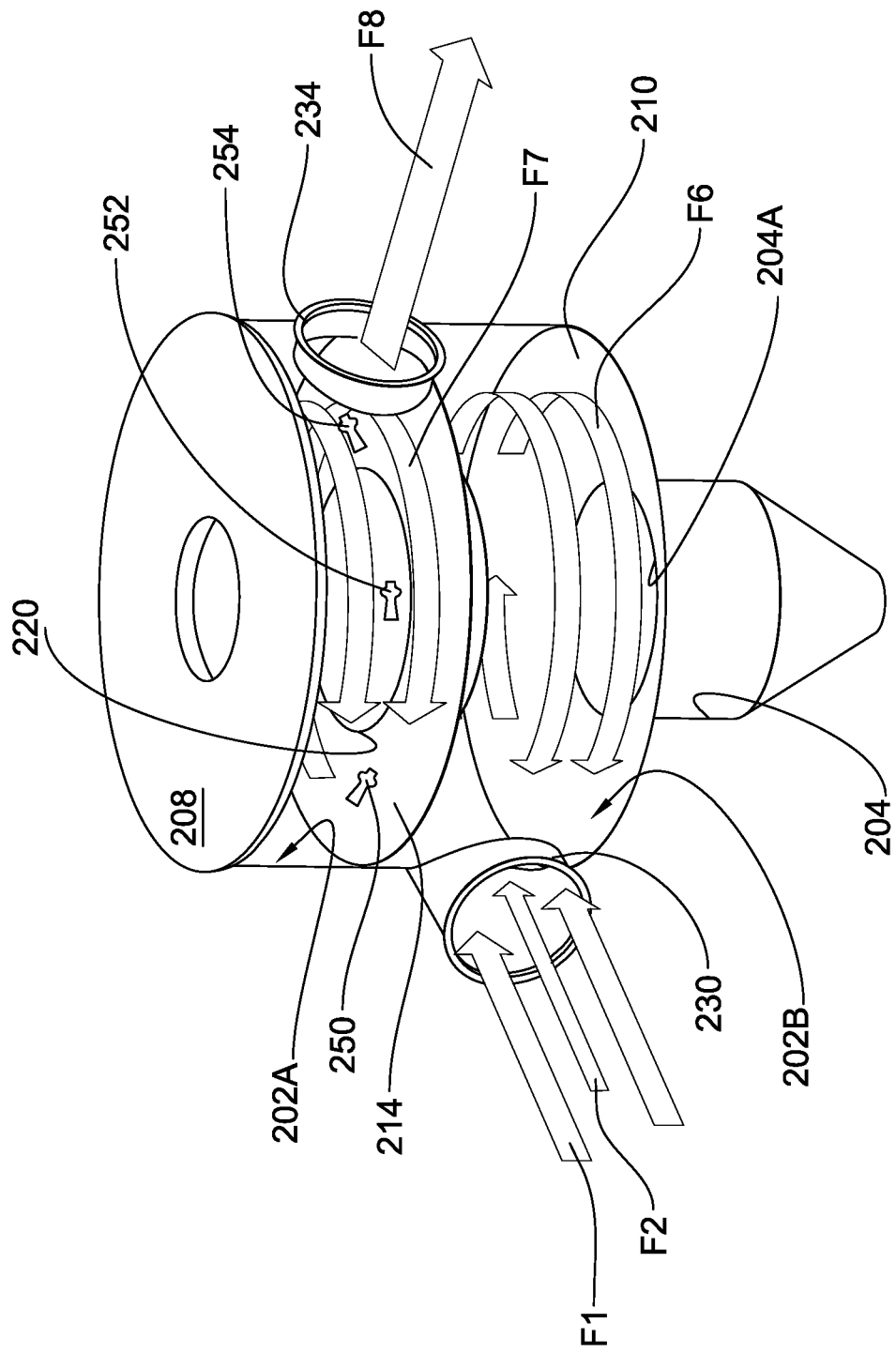
FIGS. 2 and 3 are isometric views of a first embodiment of grit removal apparatus according to the present invention, with three illustrated forward flow eductors, at 10 and 3 million United States Gallons per day (MGD) flow rates respectively, suggesting fluid dynamics at up to 3 meters/second velocity streamline.
Figure 3:
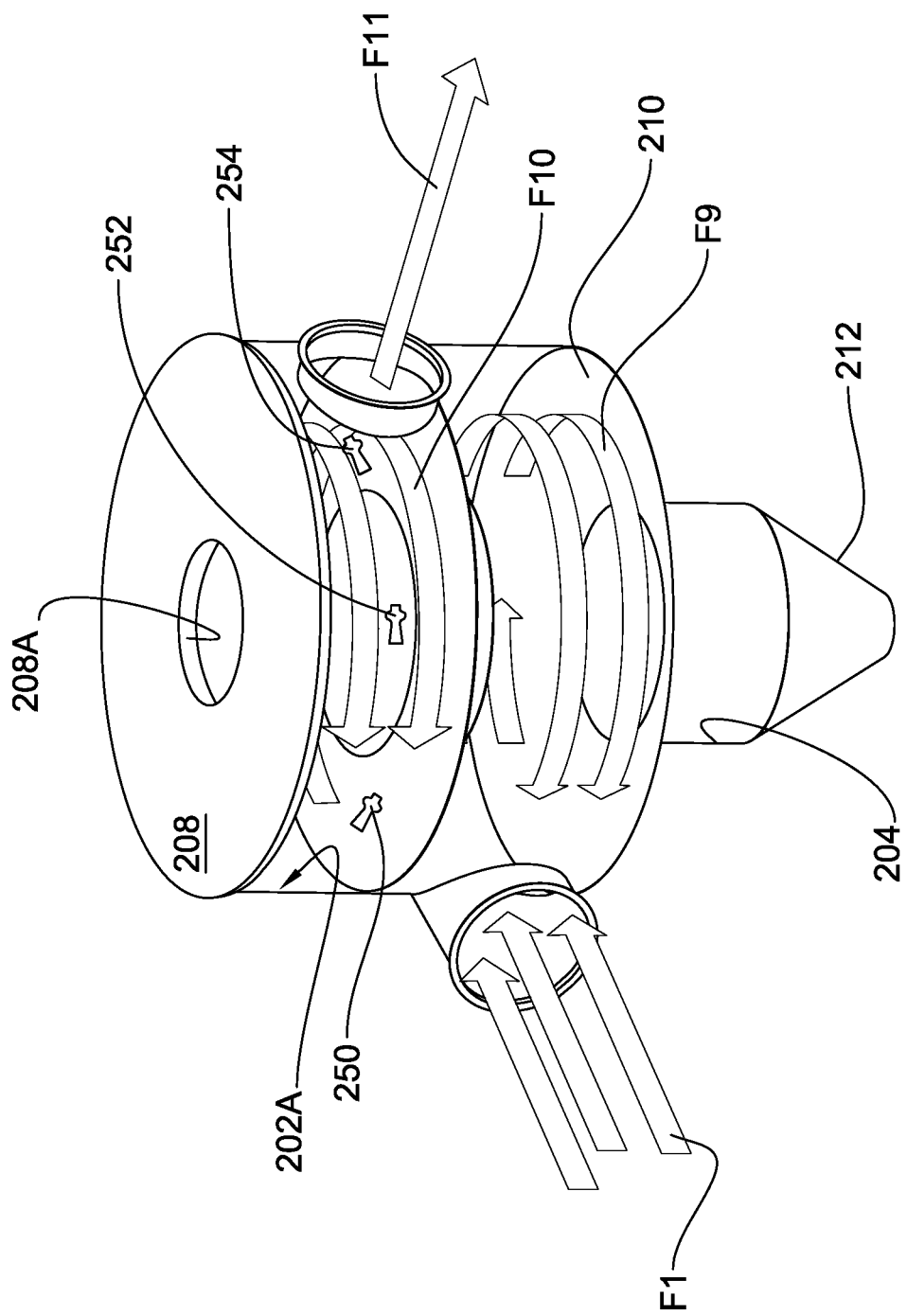

In the embodiment of FIGS. 2-3, at least one, and for example three forward flow eductors 250, 252, 254, are mounted in stationary fashion radially spacedly inside upper subchamber 202A, spacedly beneath the top wall 208 and spacedly above partition 214. Corresponding 100-series elements from FIG. 1 can be found under 200-series numerals in the embodiment of FIGS. 2-3, under 300-series numerals in the embodiment of FIGS. 4-5, under 400-series numerals in the embodiment of FIGS. 6-8 and 11-12, and under 500-series numerals in the embodiment of FIGS. 9 and 11A.

Each forward flow eductor 250, 252, 254, ejects fresh water supplied from an outside source into upper subchamber 202A in a forward fashion, i.e. in the general rotational clockwise direction of waste water flow F7, the latter coming from flow F6 in underlying lower subchamber 20213 and through partition central mouth 220. FIG. 3 shows different flow rates F9, F10 and F11 under different fluid feed loads.

Figure 4:
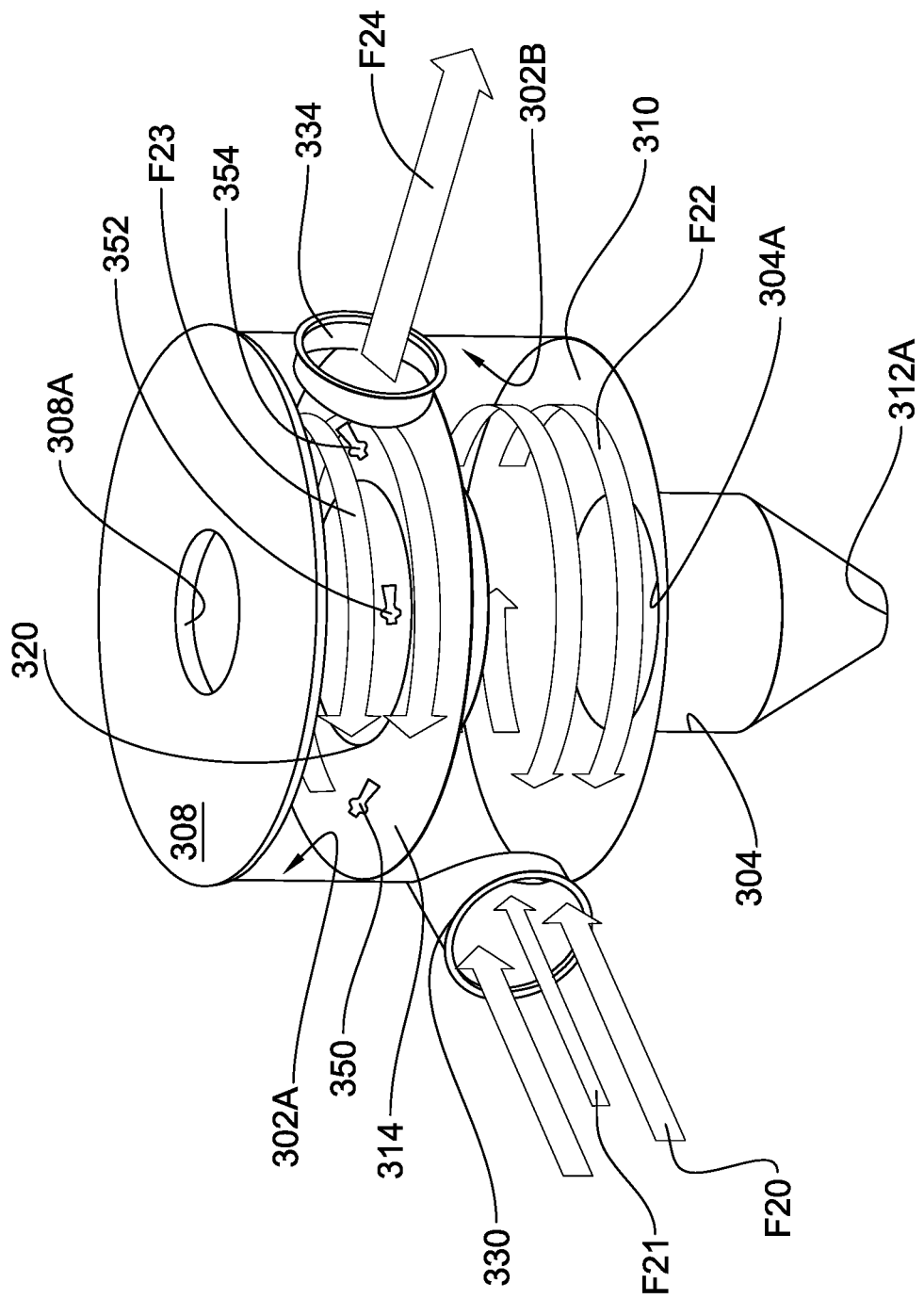
FIGS. 4 and 5 are isometric views of a second embodiment of grit removal apparatus with three illustrated reverse flow eductors at 10 and 3 MGD fluid flow rates respectively, suggesting fluid flow and fluid dynamics at up to 3 meters/second velocity streamlines.
Figure 5:
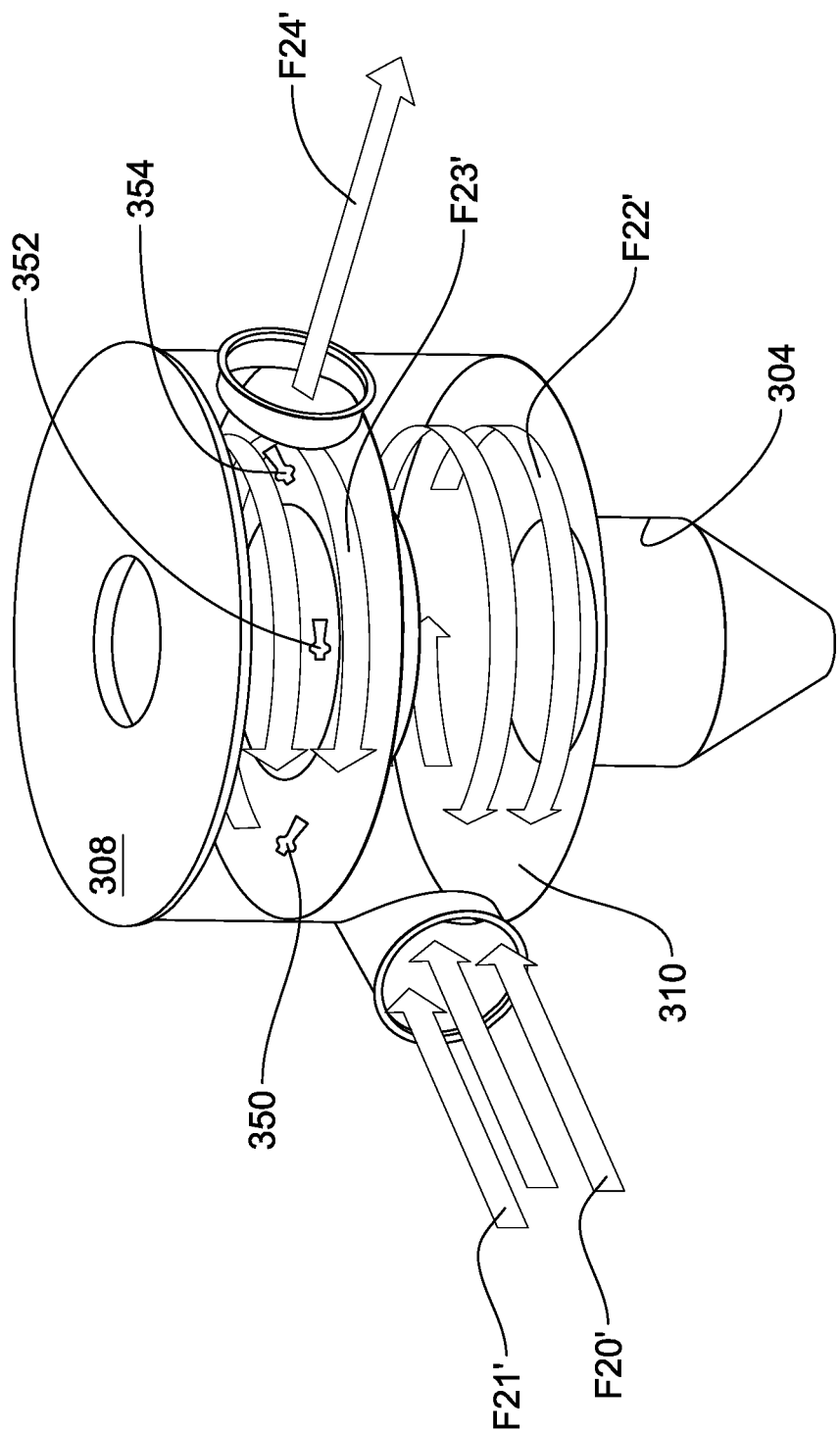
Figure 6:
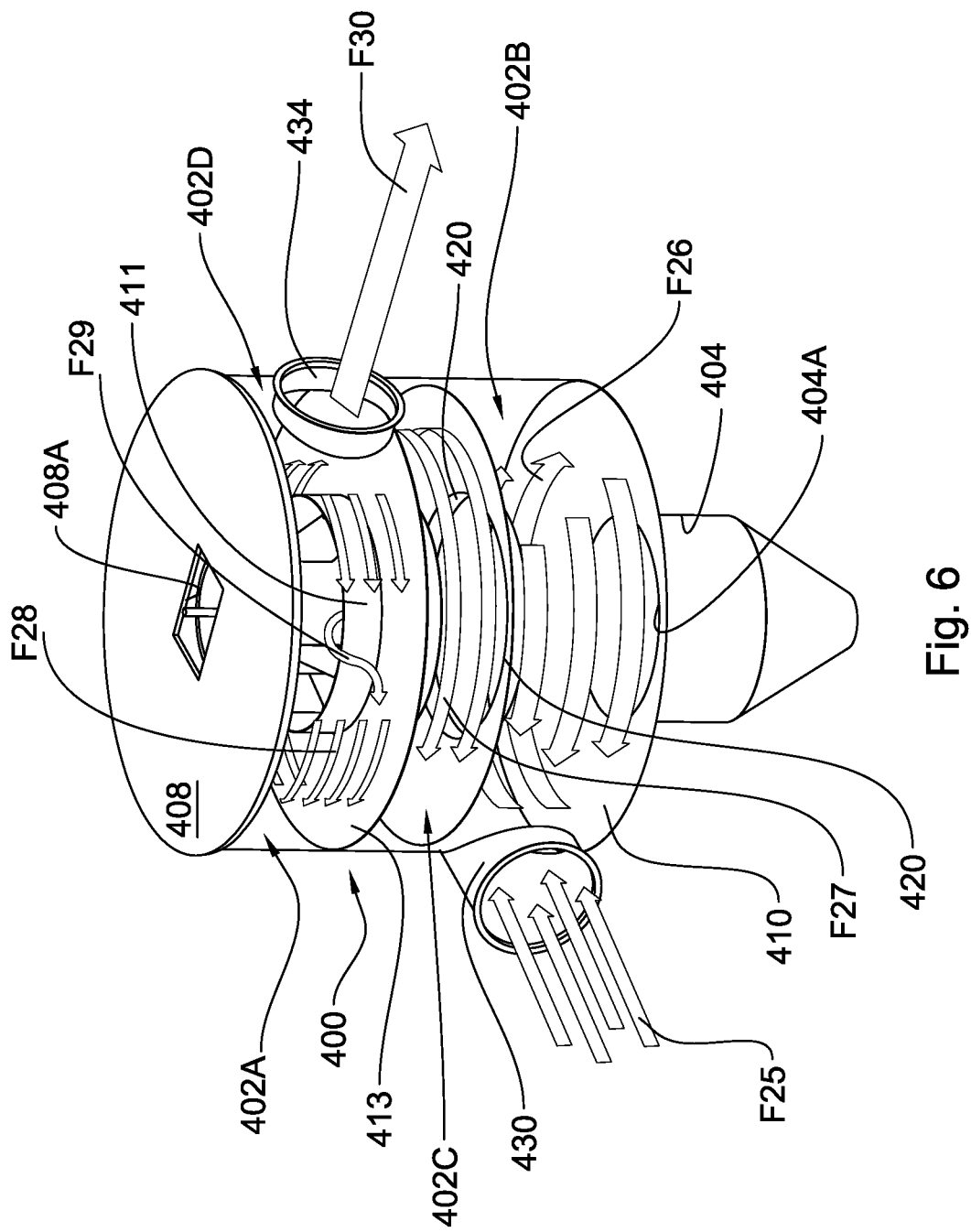
FIG. 6 shows an isometric view of a grit removal apparatus with horizontal ring grit remover, at 10 MGD flow rate, suggesting fluid dynamics at up to 3.37 meters/sec velocity streamline.
Figure 7:
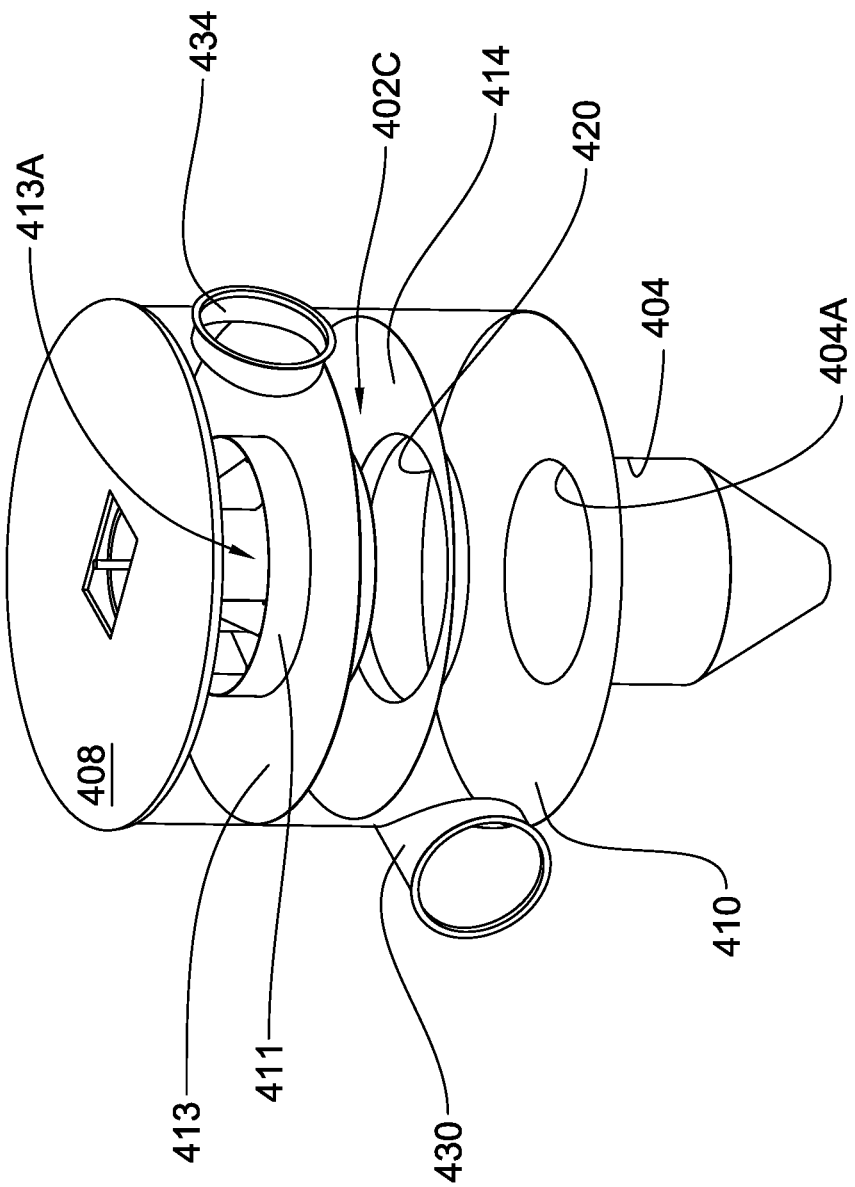
FIG. 7 shows an isometric view of the grit removal apparatus of FIG. 6, but without fluid flow arrow bands for clarity of the view.

FIG. 4 shows a grit removal apparatus 300 whose upper subchamber 302A supports three "reverse flow" type eductors 350, 352, 354, mounted in stationary position radially spacedly beneath top wall 308 and spacedly above partition 314. Alternate numbers of eductors may replace the trio of eductors 350, 352, 354, e.g. a single eductor, two eductors, four eductors, or more. Fluid flows F20 and F21 enter inlet channel 330, generating a clockwise rotating flow F22 inside lower subchamber 30213, with grit-lite liquid matrix then passing upwardly through partition central mouth 320 into upper subchamber 302A along clockwise flows F23 while separated grit, in particular fine sized grit (e.g. in the 100 to 150 micrometers range) fall under gravity forces through outlet mouth 312A towards grit storage area 403. Grit-lite liquid matrix flow F24 exits through duct 334. FIG. 5 is similar to FIG. 4 but shows alternate load feed fluid flows F20' and F21' and corresponding chamber fluid flows F22' and F23' and outflow fluid flow F 24'.

FIGS. 6 to 9 disclose an alternate grit removal chamber 400 where the upper subchamber 402A includes in addition:
  a. a horizontal annular ring 413 defining a central aperture 413A and extending intermediate partition 414 and top wall 408 spacedly therefrom; and
  b. an annular vertical wall 411, transversely mounted around partition central aperture 413A of horizontal ring 413 but extending upwardly short of top wall 408.

Horizontal annular ring 413 thus extends radially outwardly from the annular vertical wall 411 within upper subchamber 402A, so that upper subchamber 402A is divided into two separate subchambers 402C and 402D.

Grit loaded liquid matrix supply fluid flow F25 enters lower subchamber 40213 through duct 430, wherein first clockwise flow F26 is generated; grit-lite liquid matrix moves upwardly through partition central aperture 420 into intermediate chamber 402C and generates second clockwise rotating flows F27. Third clockwise fluid flow F28 is generated upon elbowed central fluid flow F20 passing through the central bore 413A of ring 413 and radially outwardly overflows over annular vertical wall 411 to reach uppermost subchamber 402D. Grit-lte liquid matrix flow F30 then exits through outlet duct 434.

Figure 8:
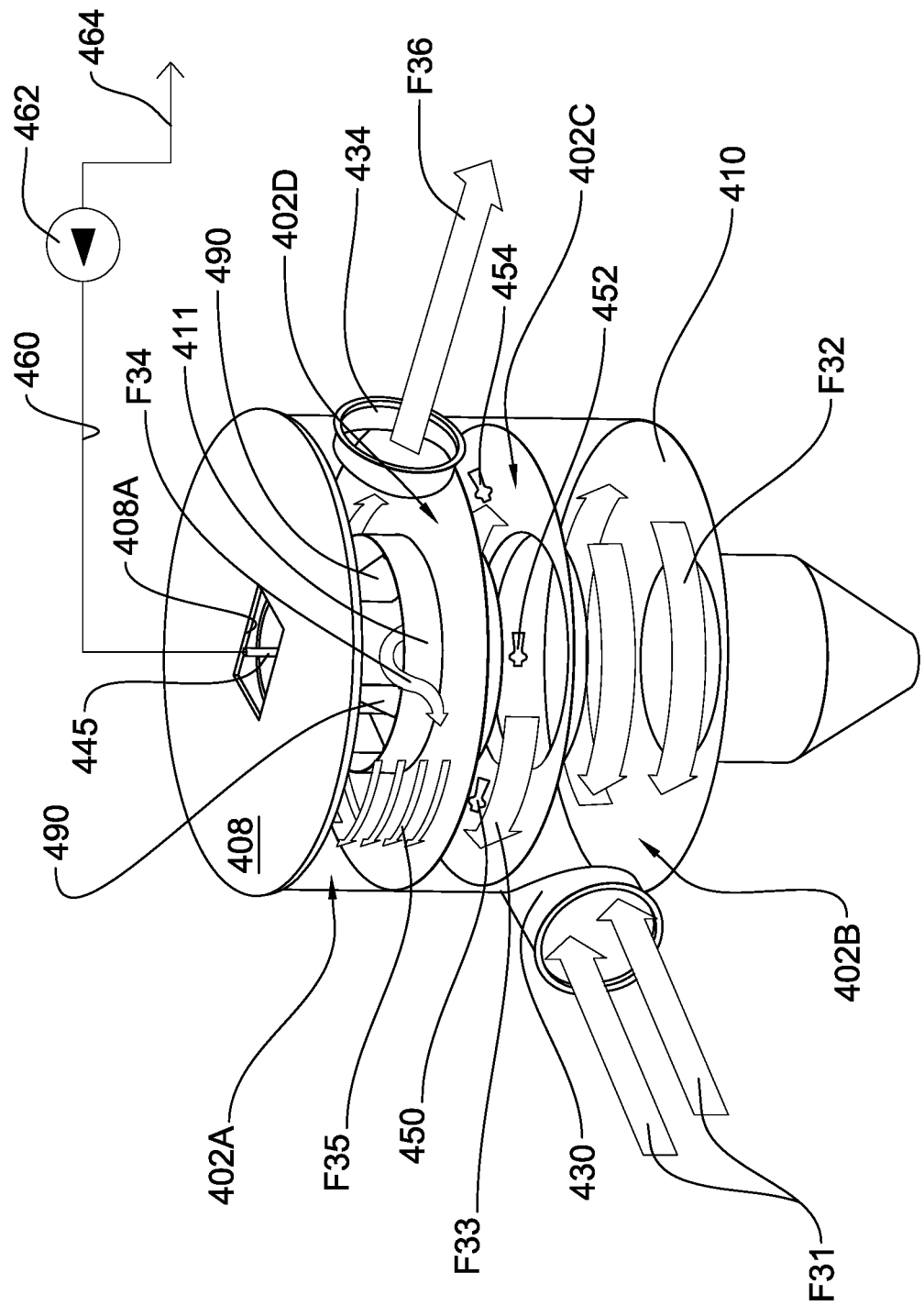
FIG. 8 shows an isometric view of a third embodiment of grit removal apparatus, with three reverse flow eductors mounted into the grit removal chamber of FIGS. 6-7, and suggesting fluid dynamics at up to 1 meter/sec velocity streamline.

FIG. 8 discloses three reverse flow type eductors 450, 452 and 454 mounted in stationary condition inside intermediate subchamber 402C of grit removal chamber 402, in the same relative radial position as with previous embodiments. Incoming liquid matrix flow F31 generates clockwisely rotating liquid matrix flow F32 inside lower subchamber 40213, clockwisely rotating liquid matrix flow F33 inside intermediate subchamber 402C, elbowed grit-lite liquid matrix flow F34 overflowing radially outwardly over annular vertical wall 411 and clockwisely rotating grit-lite liquid matrix flow F35 inside upper subchamber 402A, before escaping radially outwardly through duct 434 along grit-lite liquid matrix fluid flow F36.

Figure 9:
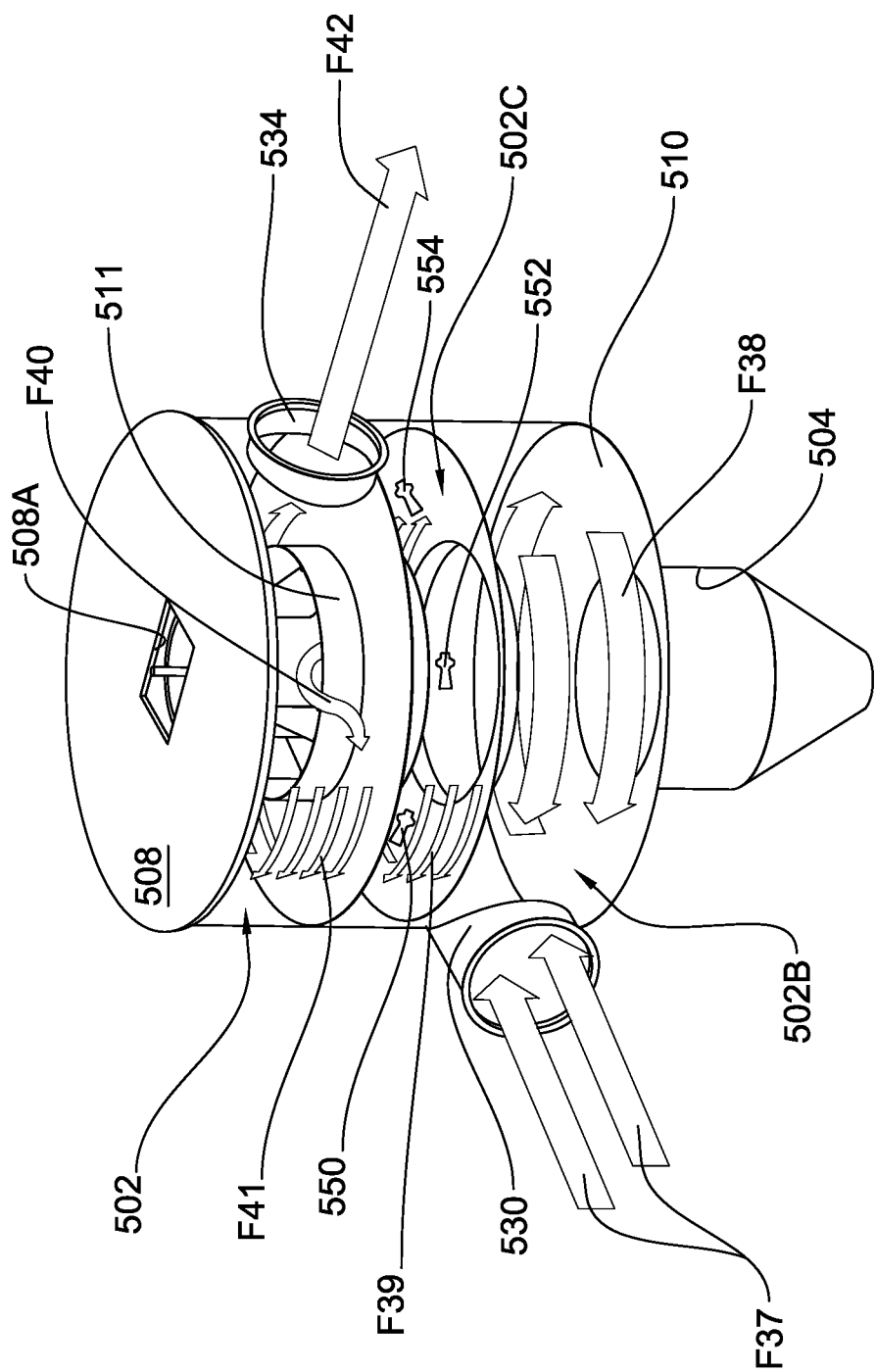
FIG. 9 shows an isometric view of a fourth embodiment of grit removal apparatus, with three forward flow eductors mounted into the grit removal chamber, and suggesting fluid dynamics of up to 25 meters/sec velocity streamline.

FIG. 9 discloses three forward flow type eductors 550, 552, 554, mounted in stationary fashion inside intermediate subchamber 502C of grit removal chamber 502, in the same relative radial positioning as with previous embodiments. Incoming grit loaded liquid matrix waste water flow F37 generates clockwisely rotating first liquid matrix flow F38 inside lower subchamber 50213, then clockwisely rotating flow F39 inside intermediate subchamber 502C, then elbowed grit-lite liquid matrix flow F39 overflowing radially outwardly over annular vertical wall 511, and clockwisely rotating grit-lite liquid matrix flow F41 inside intermediate subchamber 502A, before escaping radially outwardly through duct 534 along grit-lite liquid matrix fluid flow F42.

Figure 13:
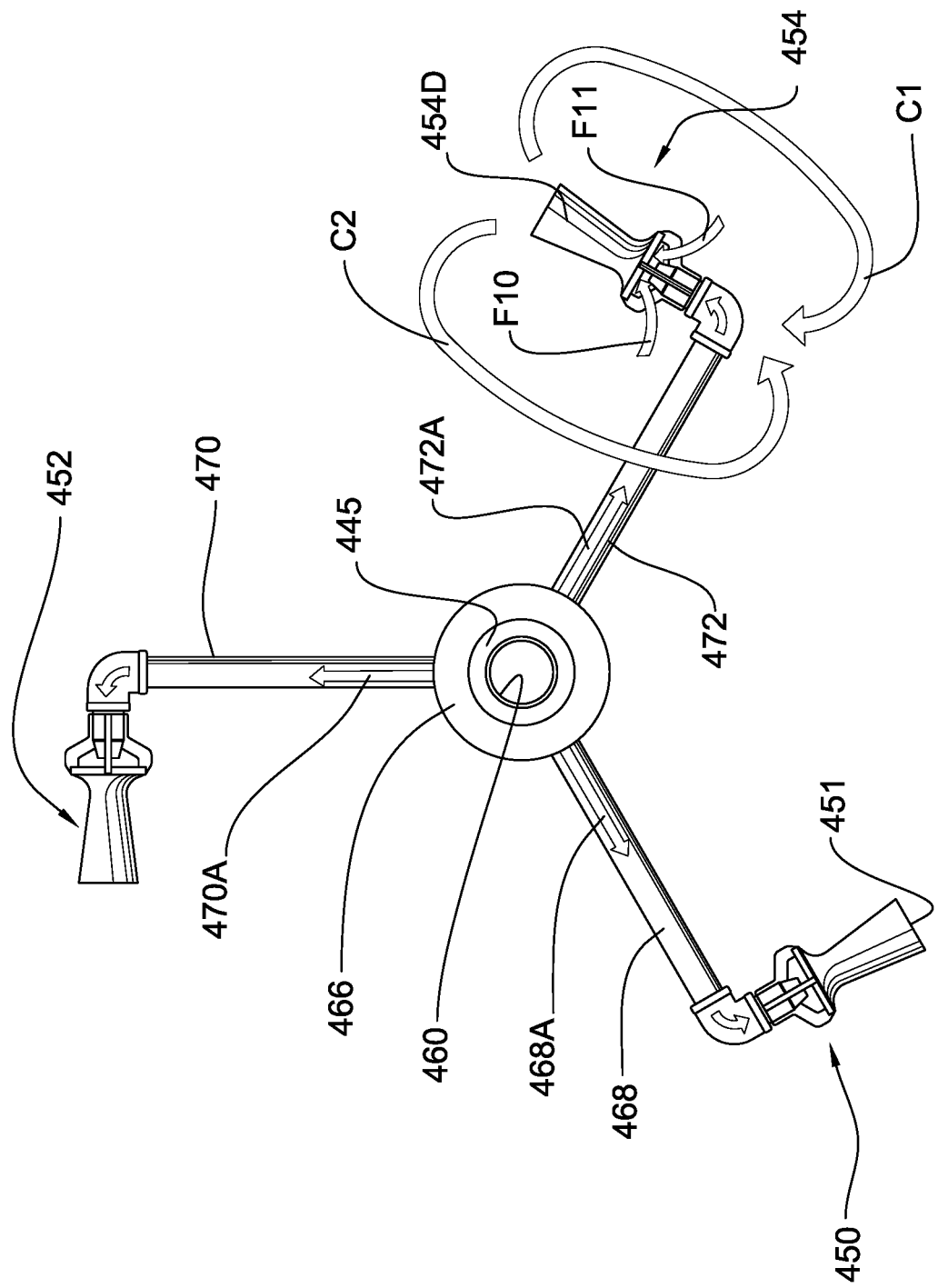
FIG. 13 is an enlarged top plan view of the triplet stationary eductors radially spacedly carried by the central shaft by three corresponding radial arms A1, A2 and A3, and suggesting fluid intake and fluid outlet flows with arrow bands on one eductor.

FIGS. 8, 12 and 13 show how fresh water is supplied to the eductors: a hollow shaft 445 extends vertically through mouth 408A of main chamber top wall 408 and into upper subchamber 402A, and is supported in position by brackets 490 integrally to chamber peripheral wall (106—see FIG. 1). A flexible water line 460 extends freely through the hollow of shaft 445 and opens at its top end into a motorized water pump 462 connected to the fresh water intake port 464 of a fresh water supply. A collar 466 is fixedly mounted to an intermediate section of shaft 445 located inside upper subchamber 202A (402A). Three horizontally extending radially equidistant hollow carrier tubular arms 468, 470, 472 radially project transversely from and are integral to shaft collar 466, each arm 468, 470, 472 supporting at its radially outwardmost end an eductor 450, 452, or 454 respectively. Main water line 460 branches out into fluid lines 468A, 470A, 472A inside the hollow of corresponding tubular arms 468, 470, 472, respectively.

Figure 10:
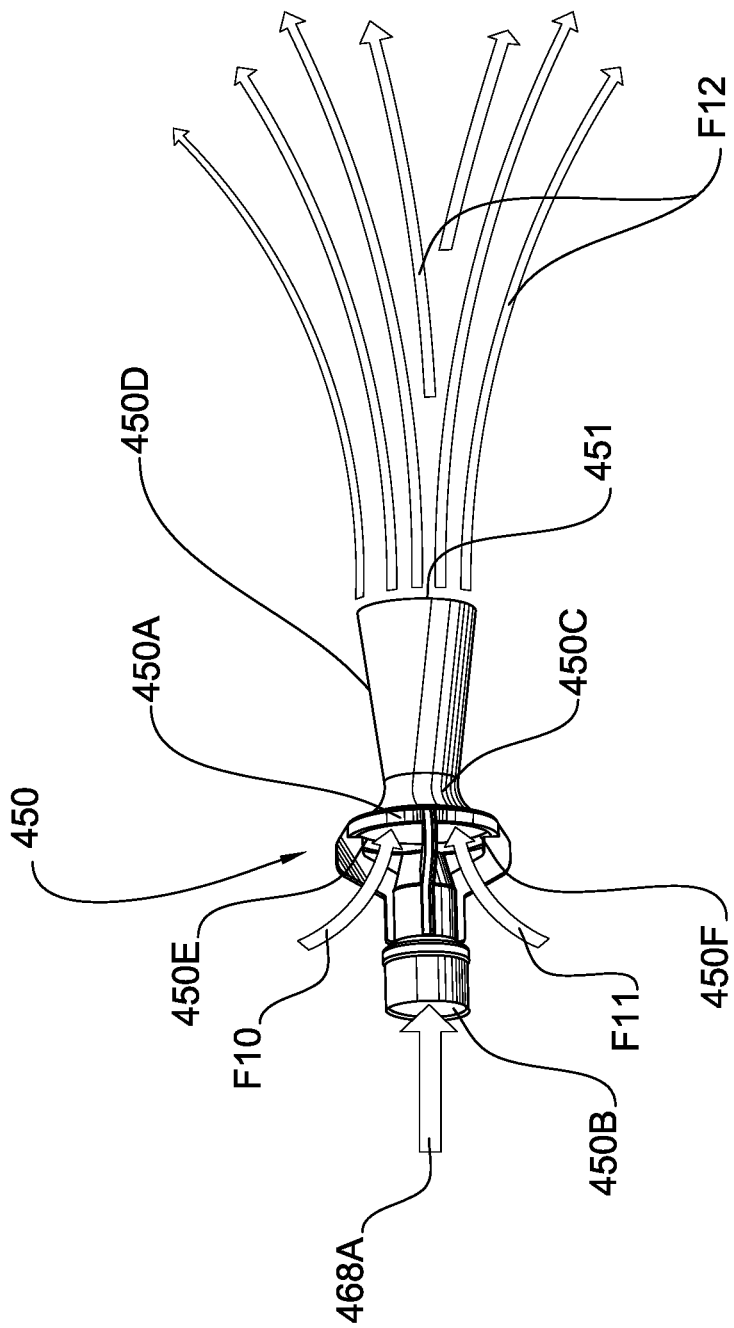
FIG. 10 is an enlarged isometric view of an eductor, suggesting an expelled first fluid flow (pressurized air or fresh water) at a smaller speed (narrower arrow bands) relative to greater speed upstream intake second fluid flow.
Figure 11:
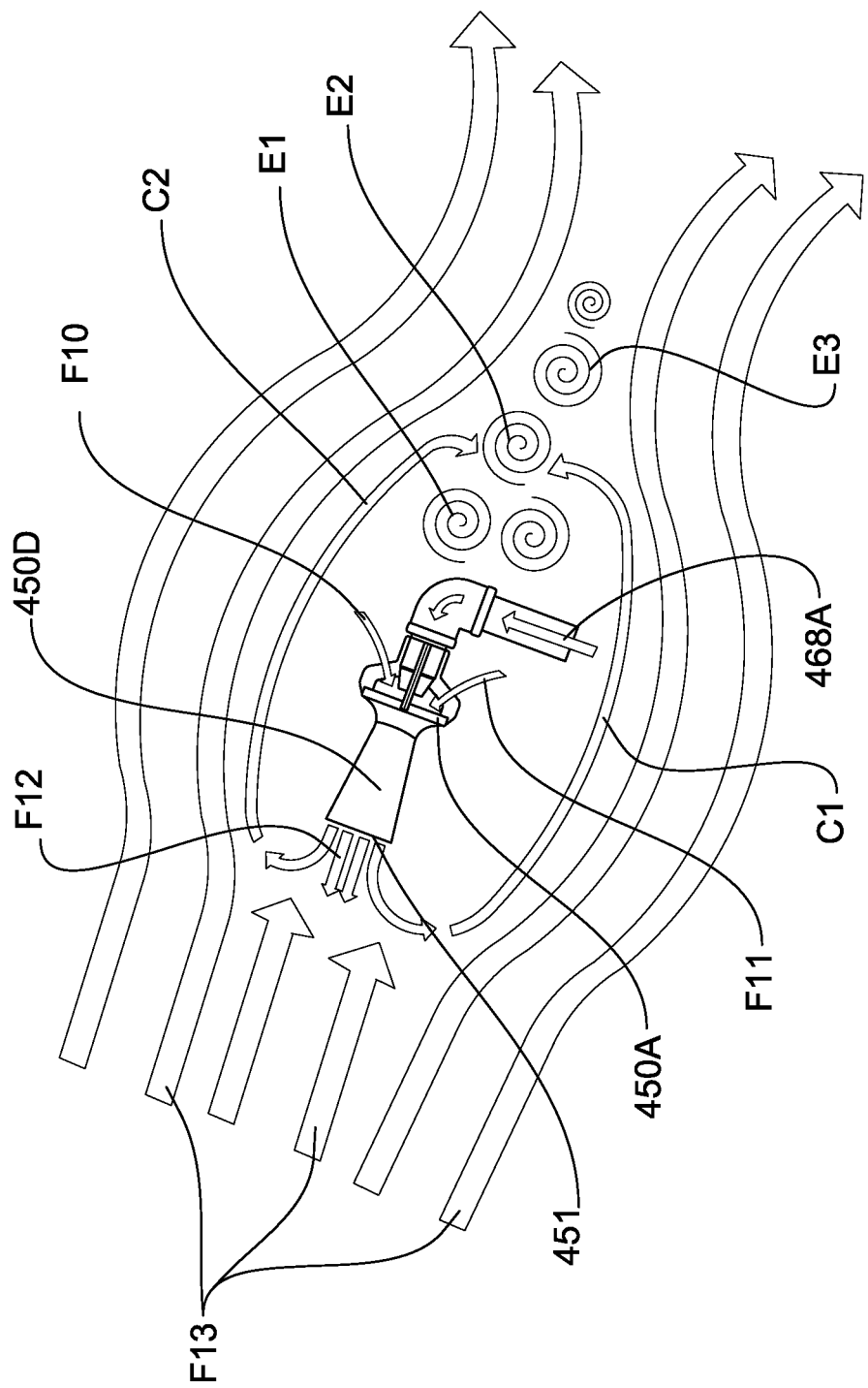
FIG. 11 is an enlarged schematic view of an eductor, at a smaller scale than FIG. 10, suggesting operational fluid dynamics with velocity swirling counter current flows generated upstream of the stationary eductor intake water flow fed to this "reverse flow" eductor, and the Eddy turbulence dissipation generated downstream of this stationary reverse eductor at the Eddy creation organic separation zone.

As best shown in FIGS. 10 and 11, each eductor 450, 452, 454 defines a main body 450A having a fresh water supply intake port 45013, coupled to a corresponding radial arm fresh water supply flow line 468A, and an outlet port 450C coupled to an enlarged outflow nozzle 450D. Nozzle 450D defines an enlarged end mouth 451 opposite eductor main body 450A and opening into upper subchamber 402A. Additional fluid intake ports 450E and 450F may be provided to allow ambient liquid matrix from inside subchamber 402A to engage into the flowstream along fluid flows F10 and F11, directly through eductor hollow main body 450A and beyond nozzle 450 through nozzle end mouth 451 and into subchamber 402A along fluid flow F12. In FIG. 11, fluid flows F12 expelled from "reverse type" eductor nozzle 450D through nozzle mouth 451 strike head on in counter current fashion against incoming upstream waste water fluid flows F13 rotating clockwise inside upper subchamber 402A, and form counter-current fluid flows C1 and C2. Accordingly, Eddy type turbulence areas E1, E2, E3 are formed downstream of the reverse flow eductor 450 being generated from dynamic fluid interaction between fluid flows C1 and C2 and fluid flow F13, so as to promote fine particle separation (eg. in the 100 to 150 micrometer diameter range) from organic material.

It has been found that unexpected improved efficiency in grit removal capability relative to prior art grit removal apparatuses, can be obtained with such a grit removal apparatus of the present invention. The efficiency level relates to the difference in liquid matrix grit content in the influent channel, as compared to that in the grit-lite liquid matrix effluent channel. In one embodiment, the liquid matrix escaping from the present grit removal apparatus consists of a grit-less liquid matrix.

Figure 11A:
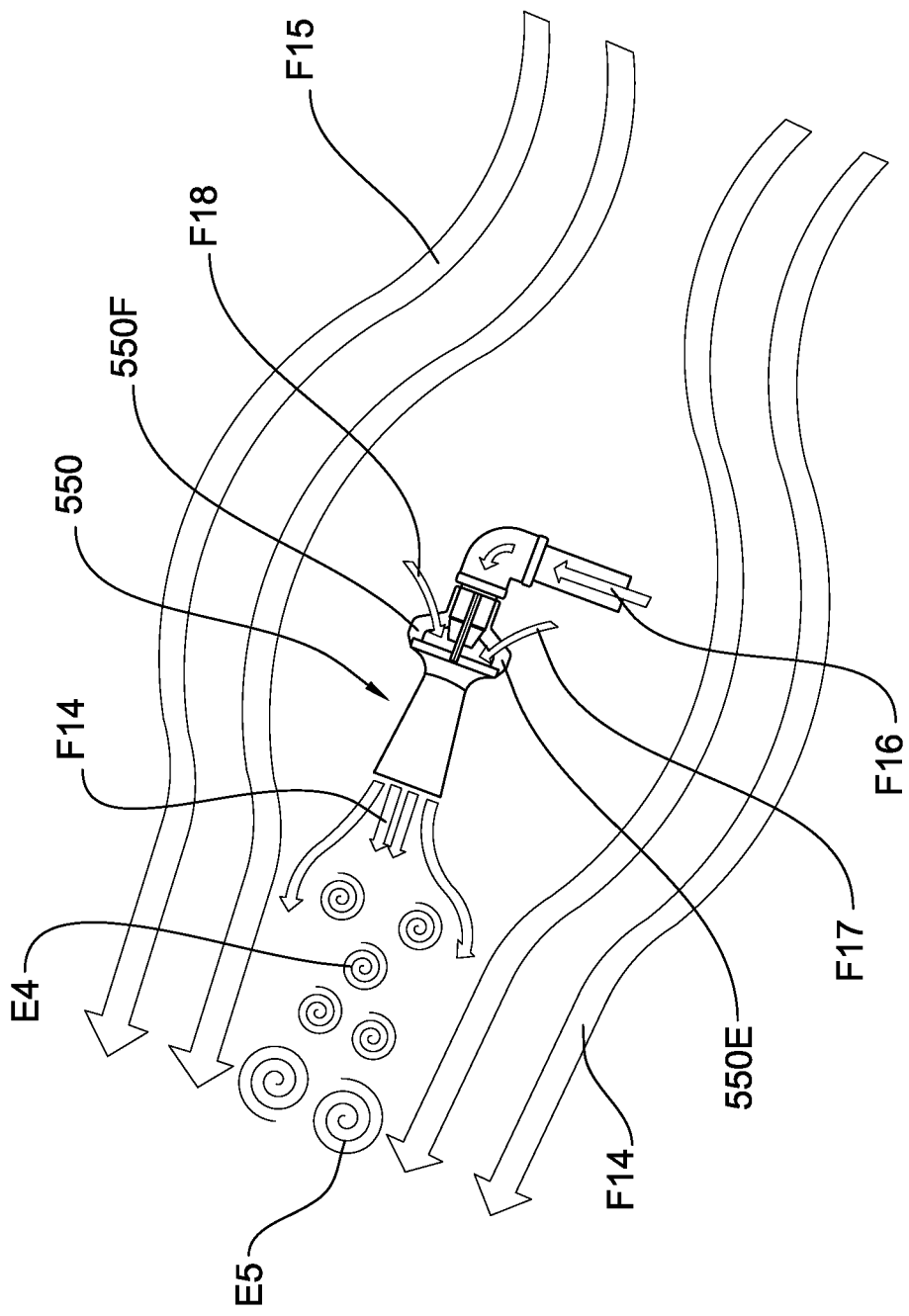
FIG. 11A is a view similar to FIG. 11 but with the reverse eductor replaced by a "forward flow" educator, with Eddy turbulence dissipation being generated downstream of this stationary forward eductor.

In FIG. 11A, "forward flow" eductor 550 expels fluid flows F14 in the general direction of incoming waste water fluid flows F15. As with FIG. 11, the fluid expelled along fluid flows comes from a mixture of both fresh water intake flow F16 connected to the shaft fluid line 445 and associated motorized water pump 462, and from fluid flows F17 and F18 through liquid matrix intake ports 550E and 550F of eductor main body 550 A. Eddy turbulence areas E4, E5 are also formed downstream of forward flow eductor 550, promoting fine particle separation (e.g. in the 100 to 150 micrometer diameter range) from organic material.

The present grit removal apparatus is particularly well suited for wastewater treatment plants, but is not limited thereto.

We claim:

1. An apparatus for separating grit from a grit-loaded liquid matrix in a liquid matrix flowstream while retaining liquid matrix organic solids in suspension and water, including an inlet for admitting the grit-loaded liquid matrix into the apparatus, an outlet for removing grit-lite liquid matrix from the apparatus, wherein the grit is separated from the apparatus, the apparatus further comprising:

a cylindrical grit settling main chamber defining a bottom end portion, a top end and a peripheral wall, the grit being separated from the apparatus at said main chamber bottom end portion;

a secondary chamber including a central grit settling access top mouth opening through said main chamber bottom end portion;

a partition extending transversely through said cylindrical grit settling main chamber intermediate said top end and said bottom end portion thereof spacedly therefrom wherein an upper subchamber is formed in said cylindrical grit settling main chamber above said partition and a lower subchamber is formed in said cylindrical grit settling main chamber below said partition, said grit-loaded liquid matrix inlet in direct fluid communication with said lower subchamber, said grit-lite liquid matrix outlet in direct fluid communication with said upper subchamber, said partition having a peripheral edge, integrally mounted in substantially fluid tight fashion to said peripheral wall of said cylindrical grit settling main chamber, and a central mouth;

wherein a liquid matrix fluid flow speed gradient is established between said upper and lower subchambers through said partition central mouth; and further including a turbulence generating fluid dynamic component, mounted inside said upper subchamber and providing enhanced fine grit separation from said grit-loaded liquid matrix, said turbulence generating fluid dynamic component producing Eddy-type turbulences inside said upper subchamber;

wherein said turbulence generating fluid dynamic component includes at least one eductor, fixedly mounted inside said upper subchamber, and a fresh water supply, each of said at least one eductor defining a hollow main body having a fresh water supply intake port, coupled to and force fed from said fresh water supply, and an outlet port, opening into and ejecting fresh water into said liquid matrix flowstream inside said upper subchamber.

2. The apparatus as in claim 1,
further including an enlarged eductor outflow nozzle, operatively connected to each of said at least one eductor outlet port.

3. The apparatus as in claim 1,
wherein said at least one eductor outlet port ejects eductor fluid flows in a same direction of flow relative to that of said liquid matrix flowstream inside said upper subchamber.

4. The apparatus as in claim 1,
wherein said at least one eductor outlet port ejects eductor fluid flows in an opposite direction of flow relative to that of said liquid matrix flowstream inside said upper subchamber.

5. The apparatus as in claim 1,
wherein there are three stationary eductors fixedly mounted to said main chamber peripheral wall in radially equidistant fashion to one another.

6. The apparatus as in claim 5,
wherein each of the at least one eductors outlet port ejects eductor fluid flows in a same direction of flow relative to that of said liquid matrix flowstream inside said upper subchamber.

7. The apparatus as in claim 5,
wherein each of the at least one eductor outlet port ejects eductor fluid flows in an opposite direction of flow relative to that of said liquid matrix flowstream inside said upper subchamber.

8. The apparatus as in claim 5,
wherein said upper subchamber is further subdivided into a top subchamber and an intermediate subchamber, said three stationary eductors mounted inside said intermediate subchamber, wherein an annular horizontal ring is formed between said top and intermediate subchambers and fixedly mounted tangentially to said main chamber peripheral wall and defining a central bore, and further including an annular vertical wall mounted within said ring central bore and projecting upwardly therefrom short of said main chamber top end, wherein said annular vertical wall forms a radially outward overflow surface for said grit-lite liquid matrix.

9. The apparatus as in claim 8,
wherein each of the at least one eductor outlet port ejects eductor fluid flows in a same direction of flow relative to that of said liquid matrix flowstream inside said intermediate subchamber.

10. The apparatus as in claim 8,
wherein each of the at least one eductor outlet port ejects eductor fluid flows in an opposite direction of flow relative to that of said liquid matrix flowstream inside said intermediate subchamber.

11. A system for separating grit from a grit-loaded liquid matrix in a liquid matrix flowstream inside a grit separating apparatus while retaining liquid matrix organic solids in suspension and water, the grit separating apparatus including
   an inlet for admitting the grit-loaded liquid matrix into the grit separating apparatus,
   an outlet for removing grit-lite liquid matrix from the grit separating apparatus, wherein the grit is separated from the grit separating apparatus,
   a cylindrical grit settling main chamber defining
      a bottom end portion,
      a top end and a peripheral wall, the grit being separated from the grit separating apparatus at said main chamber bottom end portion,
      a secondary chamber including
         a central grit settling access top mouth opening through said main chamber bottom end portion,
         a partition extending transversely through said cylindrical grit settling main chamber intermediate said top end and said bottom end portion thereof spacedly therefrom wherein
         an upper subchamber is formed in the cylindrical grit settling main chamber, said cylindrical grit settling main chamber above said partition and
         a lower subchamber is formed in said cylindrical grit settling main chamber below said partition, said grit-loaded liquid matrix inlet in direct fluid communication with said lower subchamber, said grit-lite liquid matrix outlet in direct fluid communication with said upper subchamber, said partition having a peripheral edge, integrally mounted in substantially fluid tight fashion to said peripheral wall of said cylindrical grit settling main chamber, and a central mouth, wherein a liquid matrix fluid flow speed gradient is established between said upper and lower subchambers through said partition central mouth,
         a turbulence generating fluid dynamic component, mounted inside said upper subchamber and providing enhanced fine grit separation from said grit-loaded liquid matrix, said turbulence generating fluid dynamic component includes at least one eductor fixedly mounted inside said upper subchamber, and a fresh water supply, said at least one eductor producing Eddy-type turbulences inside said upper subchamber, each said at least one eductor defining a hollow main body having a fresh water supply intake port operatively coupled to said fresh water supply, and an outlet port, opening into said liquid matrix flowstream, the system comprising the steps of:
            admitting the grit-loaded liquid matrix into the grit separating apparatus;
            generating the liquid matrix flowstream inside the grit separating apparatus;
            providing the liquid matrix fluid flow speed gradient within said liquid matrix flowstream between said upper and lower subchambers through said partition central mouth; and
            generating fluid flow Eddy type turbulences inside the upper subchamber by:
               a. force feeding freshwater into each said at least one eductor main body freshwater supply intake port, and
               b. ejecting said freshwater through and from each said at least one eductor hollow main body and into said liquid matrix flowstream in the upper subchamber;
            wherein the grit-lite liquid matrix is removed from the grit separating apparatus.

12. A system as in claim 11,
wherein an ejected fresh water flow from each of said at least one eductor outlet port flows in a same direction of flow as that of said liquid matrix flowstream inside the upper subchamber.

13. A system as in claim 11,
wherein an ejected fresh water flow from each of said at least one eductor outlet port flows in an opposite direction relative to that of said liquid matrix flowstream inside the upper subchamber.

14. Apparatus for separating grit from a grit-loaded liquid matrix while retaining liquid matrix organic solids in suspension and water, including tangential inlet means admitting the grit-loaded liquid matrix into the apparatus, grit-lite liquid matrix outlet means for removing grit-lite liquid matrix from the apparatus, and grit removing means for removing the separated grit from the apparatus, the apparatus further comprising:
   a cylindrical grit settling main chamber defining a bottom end portion, a top end and a peripheral wall; said grit removing means for removing the separated grit from the apparatus cooperating with said main chamber bottom end portion;
   a secondary chamber including a central grit settling access top mouth opening through said main chamber bottom end portion;
   a partition extending transversely through said cylindrical grit settling main chamber intermediate said top end and said bottom end portion thereof spacedly therefrom wherein an upper subchamber is formed in said cylindrical grit settling main chamber above said partition and a lower subchamber is formed in said cylindrical grit settling main chamber below said partition, said grit-loaded liquid matrix tangential inlet means in direct fluid communication with said lower subchamber, said grit-lite liquid matrix outlet means in direct fluid communication with said upper subchamber, said partition having a peripheral edge, integrally mounted in substantially fluid tight fashion to said peripheral wall of said cylindrical grit settling main chamber, and a central aperture;
   wherein a liquid matrix fluid flow speed gradient is established between said upper and lower subchambers through said partition central aperture; and
   further including a turbulence generating fluid dynamic component, mounted inside said upper subchamber and providing enhanced fine grit separation from said grit-loaded liquid matrix, said turbulence generating fluid dynamic component producing Eddy-type turbulences inside said upper subchamber.

15. Apparatus as in claim 14,
wherein said turbulence generating fluid dynamic component includes at least one eductor, fixedly mounted inside said upper subchamber, and a fresh water supply means force fed to said at least one eductor.

16. Apparatus as in claim 15,
wherein said at least one eductor generates eductor fluid flows in a same direction of flow relative to that of the grit-loaded liquid matrix inside said upper subchamber.

17. Apparatus as in claim 15,
wherein said at least one eductor generates eductor fluid flows in an opposite direction of flow relative to that of the grit-loaded liquid matrix inside said upper subchamber.

18. Apparatus as in claim 15,
wherein there are three stationary eductors fixedly mounted to said main chamber peripheral wall in radially equidistant fashion to one another, and wherein said upper subchamber is further subdivided into a top subchamber and an intermediate subchamber, said at least one eductor mounted inside said intermediate subchamber, wherein an annular horizontal ring is formed between said top and intermediate subchambers and fixedly mounted tangentially to said main chamber peripheral wall and defining a central bore, and further including an annular vertical wall mounted within said ring central bore and projecting upwardly therefrom short of said main chamber top end, wherein said annular vertical wall forms a radially outward overflow surface for said grit-lite liquid matrix.

19. Apparatus as in claim 18,
wherein said at least one eductor generates eductor fluid flows in a same direction of flow relative to that of the grit-loaded liquid matrix inside said intermediate subchamber.

20. Apparatus as in claim 18,
wherein said at least one eductor generates eductor fluid flows in an opposite direction of flow relative to that of the grit-loaded liquid matrix inside said intermediate subchamber.

* * * * *